US012565835B2

(12) United States Patent
Jones et al.

(10) Patent No.: US 12,565,835 B2
(45) Date of Patent: Mar. 3, 2026

(54) CORRELATED WAVE-PARTICLE APPLICATION FOR DOWNHOLE MEASUREMENTS

(71) Applicant: Halliburton Energy Services, Inc., Houston, TX (US)

(72) Inventors: Christopher Michael Jones, Katy, TX (US); Jeffrey James Crawford, Katy, TX (US); Ahmed Fouda, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 379 days.

(21) Appl. No.: 18/221,015

(22) Filed: Jul. 12, 2023

(65) Prior Publication Data

US 2025/0146409 A1 May 8, 2025

Related U.S. Application Data

(60) Provisional application No. 63/416,207, filed on Oct. 14, 2022.

(51) Int. Cl.
*E21B 47/135* (2012.01)
*E21B 49/08* (2006.01)
(Continued)

(52) U.S. Cl.
CPC .......... *E21B 47/135* (2020.05); *E21B 49/087* (2013.01); *G01V 9/00* (2013.01); *H04B 10/70* (2013.01)

(58) Field of Classification Search
CPC ....... E21B 47/135; E21B 49/087; G01V 9/00; H04B 10/70
See application file for complete search history.

(56) References Cited

U.S. PATENT DOCUMENTS 11,378,715 B2    7/2022   Mamtimin et al.
11,493,662 B2   11/2022   Mamtimin et al.
(Continued)

FOREIGN PATENT DOCUMENTS

CA       3157137 A1  *  5/2021   ........... H04L 9/0855
GB       2582556 A   *  9/2020   ............. H04B 10/70

OTHER PUBLICATIONS

Lib et al., "Real-time shaping of entangled photons by classical control and feedback" Science Advances 2020, 6, 37.
(Continued)

*Primary Examiner* — Elias Desta
(74) *Attorney, Agent, or Firm* — John Wustenberg; C. Tumey Law Group PLLC

(57) ABSTRACT

A system and method for taking measurements in a formation. The system may include a quantum entangled photon source that entangles an idler particle and a probe particle, a transmitter disposed in a wellbore and connected to the quantum entangled photon source by a transmitter waveguide, a receiver disposed in the wellbore, and a carrier laser connected to the receiver by a carrier waveguide. The system may further comprise a detector connected to the carrier waveguide and an information handling system in communication with the quantum entangled photon source, the carrier laser, and the detector. The method may include broadcasting a probe particle from a transmitter into a formation, capturing the probe particle with at least one receiver after the probe particle has interacted with the formation, and measuring the probe particle during an interaction with the formation using an idler particle in a detector.

17 Claims, 1 Drawing Sheet

(51) Int. Cl.
*G01V 9/00* (2006.01)
*H04B 10/70* (2013.01)

(56) References Cited

U.S. PATENT DOCUMENTS

| | | |
|---|---|---|
| 12,250,298 B2 * | 3/2025 | Lord ..................... H04B 10/70 |
| 2004/0258421 A1 | 12/2004 | Conti et al. |
| 2012/0298878 A1 | 11/2012 | Snyder |
| 2016/0209497 A1 | 7/2016 | Habif |
| 2016/0356917 A1 | 12/2016 | Bhongale |
| 2016/0363690 A1 | 12/2016 | Bhongale et al. |
| 2021/0373193 A1 | 12/2021 | Mamtimin et al. |
| 2021/0373194 A1 | 12/2021 | Mamtimin et al. |
| 2022/0291416 A1 | 9/2022 | Mamtimin et al. |

OTHER PUBLICATIONS

Xia et al., "Demonstration of a Reconfigurable Entangled Radio-Frequency Photonic Sensor Network" Phys. Rev. Lett. 2020, 124.

Mazelanik et al., "Real-time ghost imaging of Bell-nonlocal entanglement between a photon and a quantum memory" Quantum 2021, 5, 493.

Blais et al., "Circuit quantum electrodynamics" Rev. Mod. Phys. 2021, 93.

Pitsch et al., "Quantum ghost imaging using asynchronous detection" Applied Optics 2021, 60, 22.

Rodrigues et al., "Cooling photon-pressure circuits into the quantum regime" Science Advances 2021, 7, 42.

Lončar, "Diamond Nano- and Micro-sensors for Hydrocarbon Detection" School of Engineering and Applied Sciences Harvard University.

"ADR Azimuthal Deep Resistivity Service: Deep-Reading Resistivity for Well Placement and Reservoir Evaluation", Halliburton.

Saleh et al., "Noise in Classical and Quantum Photon-Correlation Imaging" Photonics Center and Department of Electrical and Computer Engineering, Boston University.

"Bright Star Look-Ahead Resistivity Service: Reveal the path ahead" Halliburton.

Bowen et al., "A characterization of continuous various entanglement" Phys. Rev. A 2004.

"EWR-Phase 4 Sensors: Complete Formation Resistivity Evaluation in Boreholes from 3 and 3/4 inches to 30 inches".

Zhu et al., "Spectral control of nonclassical light pulses using an integrated thin-film lithium niobate modulator" Light: Science & Applications 2022, 11.

"M5 integrated LWD Service: Formulation evaluation and drilling optimization in one compact collar", Halliburton.

Yu et al., "Integrated femtosecond pulse generator on thin-film lithium niobate" Nature 2022, 612.

Yu et al., "Silicon-chip-based mid-infraed dual-comb spectroscopy" Nature Communications 2018, 9.

Sharns-Ansari et al., "Thin-film lithium-niobate electro-optic platform for spectrally tailored dual-comb spectroscopy" Communications Physics 2022, 5.

Hu et al., "High-efficiency and broadband on-chip electro-optic frequency comb generators" Nature Photonics 2022, 16.

Shao et al., "Microwave-to-optical conversion using lithium niobate thin-film acoustic resonators" Optica 2019, 6,12.

Yu et al., "Mode-locked mid-infrared frequency combs in a silicon microresonator" Optica 2016, 3, 8.

Ogden et al., "High-speed broadband absorption spectroscopy enabled by cascaded frequency shifting loops" Scientific Reports 2023, 13.

Shen et al., "Unveiling contextual realities by microscopically entangling a neutron" Nature 2020, 930; https://www.nature.com/articles/s41467-020-14741-y.

Ayman et al., "Entangled-Photon Imaging of a Pure Phase Object" Phys. Rev. Lett. 2004, 93; https://doi.org/10.1103/PhysRevLett.93.213903.

Asban et al., "Quantum phase-sensitive diffraction and imaging using entangled photons" PNAS 2019, 116(24); https://doi.org/10.1073/pnas.1904839116.

Watts et al., "Photon quantum entanglement in the MeV regime and its application in PET imaging" Nature 2021, 2646.

Pittman et al., "Optical imaging by means of two-photon quantum entanglement" Physical Review A 1995, 52.

Ayman et al., "Role of Entanglement in Two-Photon Imaging" Phys. Rev. Lett. 2001, 87; https://doi.org/10.1103/PhysRevLett.87.123602.

Bornman et al., "Ghost imaging using entanglement-swapped photons" NPJ quantum information 2019, 63.

Howland et al., "Efficient High-Dimensional Entanglement Imaging with a Compressive-Sensing Double-Pixel Camera" Phys. Rev. X 2013, 3; https://doi.org/10.1103/PhysRevX.3.011013.

Luong et al., "Entanglement-Based Quantum Radar: From Myth to Reality" IEEE Xplore 2020, 35, 4.

Torromé et al., "Introduction to quantum radar" Arxiv 2021, 14238.

Sorelli et al., "Detecting a Target With Quantum Entanglement" IEEE Xplore 2021, 37, 5.

Kues et al., "On-chip generation of high-dimensional entangled quantum states and their coherent control" Nature 2017, 546.

Ciurana et al., "Entanglement-Enhanced Radio-Frequency Field Detection and Waveform Sensing" Phys. Rev. Lett. 2017, 119.

Moreau et al., "Imaging with quantum states of light" Nature Reviews Physics 2019, 1.

Genovese, "Real applications of quantum imaging" Journal of Optics 2016, 18, 7.

Gatti et al., "Entangled Imaging and Wave-Particle Duality: From the Microscopic to the Macroscopic Realm" Phys. Rev. Lett. 2003, 90; https://doi.org/10.1103/PhysRevLett.90.133603.

"Strata Star Deep Azimuthal Resistivity Service: Multilayer Mapping for Precise well placement", Halliburton.

Chan et al., "Quantum digital spiral imaging" Light:Science and Applications 2014,3.

Lopez-Mago et al., "Quantum-optical coherence tomography with collinear entangled photons" Optics Letters 2012, 37, 19; https://doi.org/10.1364/OL.37.004077.

Vallés et al., "Optical sectioning in induced coherence tomography with frequency-entangled photons" Phys. Rev. A 2018, 97; https://doi.org/10.1103/PhysRevA.97.023824.

Zhang et al., "Lensless Fourier-transform ghost imaging with classical incoherent light" Phys. Rev. A 2007, 75; https://doi.org/10.1103/PhysRevA.75.021803.

Kingston et al., "Neutron ghost imaging" Phys. Rev. A 2020, 101; https://doi.org/10.1103/PhysRevA.101.053844.

Zerom et al., "Entangled-photon compressive ghost imaging" Phys. Rev. A 2011, 84; https://doi.org/10.1103/PhysRevA.84.061804.

Kingston et al., "Ghost tomography" Optica 2018, 5, 12; https://doi.org/10.1364/OPTICA.5.001516.

Lemos et al., "Quantum imaging with undetected photons" Nature 2014, 512.

Padgett et al., "An introduction to ghost imaging: quantum and classical" The Royal Society 2017; https://doi.org/10.1098/rsta.2016.0233.

Anderson, "Quantum Entanglement Camera Images Object With Photons That Never Come Near It" IEEE Spectrum 2014.

Boes et al., "Lithium niobate photonics: Unlocking the electromagnetic spectrum" Science 2023, 379, 6627.

Menzel et al., "Path Entanglement of Continuous-Variable Quantum Microwaves" Phys. Rev. Lett. 2012, 109.

Shapiro et al., "The physics of ghost imaging" Quantum Inf Process 2012.

Baker-Jarvis et al., "The Interaction of Radio-Frequency Fields With Dielectric Materials at Macroscopic to Mesoscopic Scales" National Institute of Standards and Technology 2012, 117; http://dx.doi.org/10.6028/jres.117.001.

Zhang et al., "Entanglement-Enhanced Sensing in a Lossy and Noisy Environment" Phys. Rev. Lett. 2014, 114.

Gao et al., "Ghost imaging in transparent liquid" Journal of Optics 2017, 46.

Yang et al., "Lensless ghost imaging through the strongly scattering medium" Chin. Phys. B 2016, 25, 2.

(56)            References Cited

OTHER PUBLICATIONS

Dambach et al., "Generating entangled quantum microwaves in a Joesphson-photonic device" New J. Phys. 2017, 19; https://doi.org/10.1088/1367-2630/aa5bb6.

Flurin et al., "Generating Entangled Microwave Radiation Over Two Transmission Lines" Phys. Rev. Lett. 2012, 109.

Reichert et al., "Massively Parallel Coincidence Counting of High-Dimensional Entangled States" Scientific Reports 2018, 8.

Kalaee et al., "Quantum electromechanics of a hypersonic crystal" Nature Nanotechnology 2018.

Chang et al., "Quantum-Enhanced Noise Radar" Appl. Phys. Lett. 2019, 114.

Besse et al., "Single-Shot Nondemolition Detection of Individual Itinerant Microwave Photons" Phys. Rev. X 2018, 8.

Lescanne et al., "Detecting itinerant microwave photons with engineered non-linear dissipation" 2019.

Barzanjeh et al., "Stationary Entangled Radiation from Micromechanical Motion" Nature 2019, 570.

Terashima et al., "A Photonic System for Generating Unconditional Polarization-Entangled Photons Based on Multiple Quantum Interference" Journal of Visualized Experiments 2019, 151.

Shapiro "The Quantum Illumination Story" IEEE 2019.

Maccone et al., "Quantum radar" Phys. Rev. Lett. 2020, 124.

Fu et al., "Positive influence of the scattering medium on reflective ghost imaging" Photonics Research 2019, 7, 12.

Yin et al., "Experimental demonstration of influence of underwater turbulence of ghost imaging" Chin. Phys. B 2019, 28, 9.

Barzanjeh et al., "Microwave quantum illumination using a digital receiver" Science Advances 2020, 6, 19.

Zhuang et al., "Physical-Layer Supervised Learning Assisted by an Entangled Sensor Network" Phys. Rev. X 2019, 9.

Chan et al., "High-speed tomography of time-bin-entangled photons using a single-measurement setting" Phys. Rev. A 2012, 86.

National Materials Advisory Board Expanding the Vision of Sensor Materials National Academies of Sciences, Engineering, and Medicine. 1995; https://doi.org/10.17226/4782.

International Search Report and Written Opinion for International Patent Application No. PCT/US2023/029322 dated Jun. 24, 2025. PDF file. 7 pages.

* cited by examiner

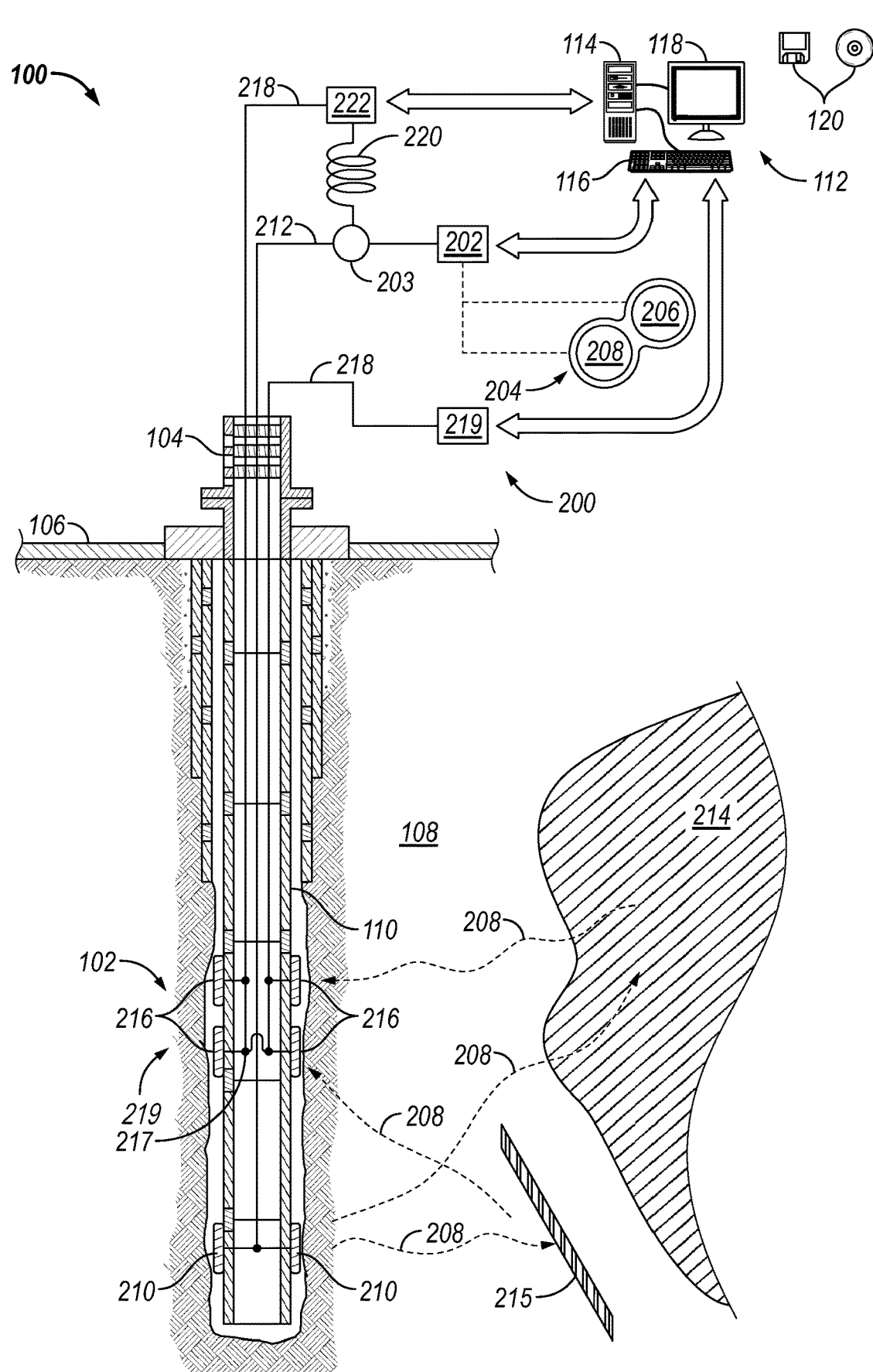

CORRELATED WAVE-PARTICLE APPLICATION FOR DOWNHOLE MEASUREMENTS

BACKGROUND

Downhole operations may generally refer to drilling, logging, measuring, and/or surveying of oil or gas wells to determine their geological, petrophysical, or geophysical properties using electronic measuring instruments. The electronic instruments are conveyed into a wellbore with on a conveyance that may be a drill string and/or an armored wired cable, which may be referred to as a wireline cable. Measurements made by downhole instruments secured to the conveyance may be transmitted back to a data processing system located at the surface through electrical conductors in the conveyance. Electrical, acoustical, nuclear, and imaging tools are used to stimulate the formations and fluids within the wellbore and the electronic measuring instruments then measure the response of the formations and fluids. The conveyance provides also electrical power and communications to the surface, required by the logging tools to operate.

For downhole logging operations, in which measurements of the formation and fluids are taken, sensors (e.g., electrical, acoustical, nuclear, and imaging) have to conform to geometry of the wellbore, whether cased or uncased. Additionally, the sensors have to conform and be calibrated to the environment, power restrictions, communication limitations, and/or telemetry restrictions. This reduces the different types of measurements, and their effectiveness, which are taken during a measurement operation.

BRIEF DESCRIPTION OF THE DRAWINGS

These drawings illustrate certain aspects of some examples of the present disclosure and should not be used to limit or define the disclosure.

FIG. 1 illustrates an example of a quantum entanglement system.

DETAILED DESCRIPTION

This disclosure may generally relate to systems and methods for moving downhole measurements uphole on correlated particles to those interacting with material downhole. This removes restrictions created by wellbore geometry, whether cased or uncased, environmental restrictions, power restrictions, communication limitations, and/or telemetry restrictions.

FIG. 1 illustrates a cross-sectional view of a quantum entanglement system 100. As illustrated, quantum entanglement system 100 may be disposed on and/or within a wellbore 102. Wellbore 102 may extend from a wellhead 104 disposed on surface 106 into a formation 108. Generally, wellbore 102 may include horizontal, vertical, slanted, curved, and other types of wellbore geometries and orientations. Wellbore 102 may be cased or uncased. In examples of a cased wellbore 102, wellbore 102 may comprise a metallic material, such as tubular 110. By way of example, the tubular 110 may be a casing, liner, tubing, or other elongated steel tubular disposed in wellbore 102. As illustrated, wellbore 102 may extend through formation 108. Wellbore 102 may extend generally vertically into formation 108. However, wellbore 102 may extend at an angle through formation 108, such as horizontal and slanted wellbores. For example, although wellbore 102 is illustrated as a vertical or low inclination angle well, high inclination angle or horizontal placement of the well and equipment may be possible. It should further be noted that while wellbore 102 is generally depicted as a land-based operation, those skilled in the art may recognize that the principles described herein are equally applicable to subsea operations that employ floating or sea-based platforms and rigs, without departing from the scope of the disclosure.

As illustrated, quantum entanglement system 100 may be utilized in measurement operations to take one or more measurements within formation 108. Measurements may comprise the measurement of electric fields, magnetic fields, electromagnetic radiation, and/or gravity fields. Electromagnetic radiation may be one type of particle that may be detected, however, other particles include mater described as a singular wave function such as but not limited to atoms, elementary particles, and pseudo particles where pseudo particles may be systems that behave as an isolated particle such as electron holes, vacancies in crystal latices such as but not limited to diamond vacancies or nitrogen vacancies or the interaction or combination of all particles described herein. The measurement of these particles may allow inferred, measured, or inverted physical and or chemical properties of a system including material properties, material geometries, heterogeneities, or positions. Material properties may comprise of resistivity, dielectric constant, fractures, water fronts, gas fronts, material composition such as carbon dioxide, oil, gas, water, salinity, gas to oil ratio as a few examples. The positioning may include racial position, azimuth position or depth position with respect to a reference. During measurement operations, quantum entanglement system 100 may be operated and controlled by an information handling system 112. For example, signals recorded by quantum entanglement system 100 may be stored on memory and then processed by information handling system 112. Processing may alternatively occur downhole or may occur both downhole and at surface. Information handling system 112 may process the signals, and the information contained therein may be displayed for an operator to observe and stored for future processing and reference. Information handling system 112 may also contain an apparatus for supplying control signals and power to quantum entanglement system 100.

Systems and methods of the present disclosure may be implemented, at least in part, with information handling system 112. Information handling system 112 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 112 may be a processing unit 114, a network storage device, or any other suitable device and may vary in size, shape, performance, functionality, and price. Information handling system 112 may include random access memory (RAM), one or more processing resources such as a central processing unit (CPU) or hardware or software control logic, ROM, and/or other types of nonvolatile memory. Additional components of the information handling system 112 may include one or more disk drives, one or more network ports for communication with external devices as well as various input and output (I/O) devices, such as an input device 116 (e.g., keyboard, mouse, etc.) and a video display 118. Information handling system 112 may also include one or more buses operable to transmit communications between the various hardware components.

Alternatively, systems and methods of the present disclosure may be implemented, at least in part, with non-transitory computer-readable media 120. Non-transitory computer-readable media 120 may include any instrumentality or aggregation of instrumentalities that may retain data and/or instructions for a period of time. Non-transitory computer-readable media 120 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

With continued reference to FIG. 1, quantum entanglement system 100 may comprise an entanglement laser system which may be connected to information handling system 112 by any wireless and/or wired communications. Entanglement laser system 200 may produce particles that are entangled. This may be done through direct production or entanglement transfer. Direct entanglement production includes laser systems for instance produces squeezed light in order to correlate multiple photons in a wave front, down conversion of optical light through a nonlinear crystal as in laser light, ring oscillated light with a chirp, emission from other entangled particles, emission from quasi particles such as superconducting circuits as examples. During measurement operations, entanglement laser system 200 may be utilized as a quantum entangled photon source 202 (i.e., a quantum circuit for entangled Radio Frequency (RF) photons) to create entangled particles 204. Entangled particles 204 may be created utilized a classical, or quantum correlated photons or a mixture therein (i.e., an entanglement). For as a nonlimiting instance particles may be created simultaneously from a single quantum event, down-converted from existing particles into one or more sub particle groups, combined from other correlated particle groups, resonated from quantum circuits, or emitted from relativistic particles. Particles may be generated from x-ray or higher energies to radio frequencies or lower energies. During entanglement operations, multiple entangled particles 204 may be generated such that more than two entangled particles 204 may be generated.

Entangled particle 204 may comprise an idler particle 206 that is entangled with a probe particle 208. Entangled particles may be entangled in one or more properties. A set of particles may be modulated classically to obtain correlations or produced quantum mechanically as entangled. Classical entangled particles may have some of the advantageous properties of entangled particles including improved imaging or spectroscopy, but not advantages gained by quantum entangled action at a distance. It should be noted that idler particle 206 and probe particle 208 may be photons, wave-particles, or any type of quantum particle that may in part behave like waves or electromagnetic waves that may in part behave like particles. Particles that may behave with quantum characteristics comprise photons, atoms, ions, elementary particles, groups of particles such as Bose-Einstein condensates, pseudo particles such as lattice holes, electronic circuit resonance, or surface plasmons. Entanglement may be a transferred property from one particle to another and may be secondary source for entangled particles. After entanglement within laser system 200, entangled particle 204 is broadcast as a radio-frequency to splitter 203. At splitter 203, idler particle 206 is guided to idler waveguide

220 and probe particle 208 is guided to a transmitter waveguide 212 for broadcasting probe particle 208 into formation 108.

During measurement operations, probe particle 208 may be transmitted from entanglement laser system 200 to a transmitter 210 through transmitter waveguide 212. As illustrated, transmitter 210 may be disposed on the outside of tubular 110. However, transmitter 210 may also be disposed inside of tubular 110. Additionally, transmitter 210 may be permanently installed, semi-permanently installed, and/or transient. In examples, transmitter 210 may be an antenna designed as a superconducting circuit, a reflector designed to redirect EM radiation directionally such as a radar dish, a system designed to down convert radiation such as a nonlinear crystal, a meta material, an emitting entangled particle or quasi particle, a cyclic ring resonator or resonator system. From transmitter 210, probe particle 208 may be transmitted into formation 108 where probe particle 208 may interact with fluids 214 and/or rock formation 215 within formation 108. Fluids 214 may comprise formation fluids, a wellbore fluid, and/or water. As probe particle 208 interacts with formation 108 and/or fluid 214, one or more probe particles 208 may scatter in any direction. During scattering, probe particles 208 may reflect back toward wellbore 102 in which one or more receivers 216 may collect probe particle 208.

As illustrated, each of the one or more receivers 216 may be disposed on the outside of tubular 110. However, each of the one or more receivers 216 may also be disposed inside of tubular 110. Additionally, each of the one or more receivers 216 may be permanently installed, semi-permanently installed, and/or transient. In examples, a receiver 216 may be quantum receivers or classical receivers such as detectors, antennas, entangled or not, particles, particle systems, transfer systems such that entanglement is transferred to a different particle system and then that secondary particle system is detected by quantum or conventional means. In examples, receiver 216 may be a bucket detector. A may take measurements that may be portioned into time bins (or bins of another relevant photon characteristic). If probe particles 208 characteristics are varied as a function of time or other binning property, (i.e., in phase, amplitude, polarization, etc.) then the number of interactions per unit time, using the methods and systems described above, may be discovered and coincidently counted as interacted or not. Analysis of the material or system property may take place based on the photon properties measured uphole using idler particle 206 and detector 222, the methods and systems discussed below. The inversion of material properties may take place by conventional means i.e., using standard spectroscopy techniques, or imaging techniques, tomography techniques, or model-based inversion on information handling system 112.

After probe particle 208 has been received and/or captured by a receiver 216, probe particle 208 may be copied from a radio-frequency (RF) medium to an optical medium at (interface 217). RF may be converted to optical by means of transfer of entanglement from an RF particle to an optical particle. This may happen through various means such as a nitrogen vacancy system, or a nonlinear lithium niobate crystal in the presence of an RF field. Once a conversion of the quantum information to an optical medium has been completed, the quantum information may be brought to surface utilizing carrier waveguide 218. Carrier waveguide 218 may be connected to carrier laser 219. Carrier laser 219 may be an optical telecom laser transmitted on an optical waveguide. In operations, carrier laser 219 may emit a carrier light through carrier waveguide 218. Carrie laser 219 does not need to be used to prepare quantum illuminated light as entanglement may be transmitted to those carrier laser photons. Alternatively, carrier laser 219 may be used to help directly read the quantum state of the RF at the detector point. As illustrated carrier waveguide 218 is connected to receiver 216 at interface 217.

At interface 217, quantum information is transferred from an RF medium to an optical medium, as described above. This enables measurements to be conducted uphole on downhole quantum information that describes the state of probe particle 208. Thus, measurements utilizing probe particle 208 for acoustic, NMR, or other energy measurements, and entangled particles may be used as measurements for nuclear measurements. Large amounts of information may also be moved by coincidence detection. Whereas the uphole telemetry only carries the information of coincidence, the uphole photons carry high resolution information about the material properties. This bandwidth of information was not directly transmitted uphole, but is obtained uphole, nonetheless. As such, entangled photon measurements based on idler particles 206 provide an inherent compression advantage for the information being probed. Such a coding system could also be used to enhance the bandwidth of telemetry systems. Such coincidence measurements also have an inherent noise advantage both for measurement purposes and for telemetry purposes. Utilizing carrier waveguide 218, quantum information is transported to detector 222. At detector 222 the quantum information is utilized in tandem with quantum information from idler particle 206, as described below. The quantum information captured by each receiver 216 may be utilized as part of a quantum sensor network 219.

In a quantum sensor network 219 receivers 216 are either prepared in a quantum entangled state or naturally obtain a quantum entangled state by interaction with quantum particles such as illuminated photons. Receivers 216 act as a single sensor in that they may be inherently balanced, and the statistics of variance reduction follows an inverse linear law as opposed to an inverse square root law. This is true regardless of the positions of receivers 216 or distance between receivers 216 so long as entanglement is maintained. For a classical sensor network, the improvement noise drops as $k1/sqrt (n)$, whereas for an entangled sensor network it drops as $k2/n$ where k1 and k2 are proportionality constants determined by the systems efficiency and in many circumstances are close to 1.

For example, while probe particle 208 is being transmitted into formation 108, idler particle 206, which is entangled with probe particle 208 may be transmitted into idler waveguide 220 or other advantageous idler apparatus such as free path idling or reflective idling, or metamaterial idling wherein the metamaterial has a sufficient property to slow the progression of idler particle 206 through free space including but not limited to high refractive index materials or high dielectric constant materials. In examples, idler waveguide 220 may be a resonant cavity, long path, fiber optic, or any other suitable material. It should be noted that both transmitter waveguide 212 and idler waveguide 220 may be comprised of any material that may allow idler particle 206 and probe particle 208, respectfully, traverse transmitter waveguide 212 and idler waveguide 220 in a band gap. This may allow idler particle 206 and probe particle 208 to move without interaction with the waveguide material. Idler particle 206 may remain in idler waveguide 220 while probe particle 208 is transmitted into formation 108 through transmitter 210. Idler waveguide 220 and transmitter waveguide 212 may be a fiber optic, conductive tubing/pipe, meta-material, etc.

As noted above, during measurement operations, when probe particle 208 moves through formation 108, probe particle 208 may interact with formation 108, formation fluid (not shown), wellbore fluid (not shown), or wellbore casing. During interaction between probe particles 208 and formation 108, photon flux may be dampened by the material or phase shifted. Some interactions are destructive, consuming probe particles 208 whereas other interactions modify probe particles 208. Interactions may be reflective, scattering or the like. One or more property of probe particles 208 may be modified. Properties which are not modified may remain correlated. A correlated but modified probe particle 208 may be detected, or the un-interacted probe particles 208 may be detected.

At the same time, idler particle 206 may move from idler waveguide 220 into detector 222. Thus, as both idler particle 206 and probe particle 208 are entangled, when probe particle 208 is altered, idler particle 206 is altered in detector 222, which measures this alteration. Detector 222 may determine the characteristics of idler particle 206 with a high degree of certainty and thereby determine the characteristics of idler particle 206. Measuring of downhole material property may be made by measuring idler particle 206 with detector 222 to derive the properties of probe particle 208 which interacted with a downhole material. Detection may be on directly interacted probe particles 208, or by inference as the complement to those probe particles 208 that did not interact with formation 108. Detector 222 may communicate with information handling system 112 to process the measurements taken by detector 222 between idler particle 206 and probe particle 208. This may allow for imaging, spectroscopy, tomography, or contrast detection within formation 108.

Detector 222 may provide probe photon's 208 properties such as but not limited to phase, amplitude, and polarization as a single incidence or a composite of multiple photons. Counting statistics provide a measure of the composite interaction of probe particles 208 with formation 108 for detector 222 as coincident with receiver 216. Idler particle 206 and probe particle 208 need not be of the same frequency, and therefore convenient detection frequencies for highly sensitive detectors 222 may be used for the measurement of particles at a convenient frequency. As noted above, multiple entangled particles 204 may be generated such that more than two entangled particles 204 may be generated. As such because only two particles need to be detected, the coincidence options of which entangled particles 204 to detect may be chosen as advantageous to the geometric setup. In such a setup the principle of inference of undetected photons described above also applies.

Advantages of detecting probe particles 208 by proxy of entangled (i.e., correlated) idler particles 206, include use of equipment and geometric setups that may not be conducive to downhole envelops and conditions. Such equipment may also be temperature, pressure, or vibration sensitive. Downhole, only a coincident indication needs to be made for the probe particle 208 in order to provide an indication of idler particle 206 to which it is coincident. A coincidence circuit which may be an electrical circuit or other information carrying method is used to allow the processing of idler particles 206 for the purpose of interaction measurement with the remote material (formation, formation fluid, wellbore fluid, wellbore casing, or the like). Non-conductive methods of information carrying include mud pulsed telemetry, acoustic telemetry, memory recording with physical movement and the like. This may be based on time or property of probe particle 208 with a low-resolution interaction. The indication interaction may be with a low-resolution detector or material or other particles for which an indication may be made. Such a detector may be suitable for downhole use.

The methods and systems discussed above may be utilized for any particle probe measurements such as photoacoustic measurements, nuclear magnetic resonance measurements, dual photon pump probe measurands. In the case of NMR measurements, the nuclei of hydrogen atoms are aligned by a magnetic field, and subsequently probed by radio frequency measurements. The quality of the measurement is generally low, but still provides useful imaging for conventional applications. By using entangled particles 204 as the probe radio frequency, a much more accurate and precise NMR measurement may be made and may even allow high resolution chemical shift NMR. In other embodiments, the downhole material i.e., formation, formation fluid, wellbore casing, or wellbore fluid may be perturbed by an energy such as acoustic energy. The state of the perturbation such as but not limited to the phase of the acoustic energy may be probed by a radio frequency photon. The measurement of the acoustic perturbation may be used to determine material properties as with the NMR measures. In another example, optical spectroscopy such as Fourier Transform Infrared (FTIR) spectroscopy or Laser-Induced Breakdown Spectroscopy (LIBS) may be used to measure material properties downhole. Probe particle 206 may be used as the laser source within those spectrometers downhole. Entangled idled particles 208 would reflect those measurements uphole These, as nonlimiting examples demonstrate the methods in which entangled particle measurements may be used in conjunction with other energy perturbation techniques to measure material properties. Such measurements may allow flow within a formation, or pressure gradients to be determined as examples of nonmaterial system property measurements. Optical spectroscopy, imaging, tomography, are a few examples of measurement techniques that may be applied to probe particle 208.

The methods and systems described above are improvements over current downhole measuring techniques. Specifically, downhole measuring techniques do not utilize quantum entanglement. Quantum entanglement may allow for downhole measurements to be made by detecting the correlation of a downhole photon or photon group with that of an uphole photon or photon group. The measuring of downhole material property may then be made on the uphole photon to derive the properties of the downhole photon which interacted with a downhole material. Uphold measurement may be done more precisely than downhole measurement and as such more accurately determined. For instance, it would be difficult to use a liquid nitrogen or liquid helium cooled detector downhole but easy to use one uphold. This allows for very accurate measurements. Likewise, an interferometer system may have a large footprint at surface, but abilities would be reduced if not impossible in limited to a confined spaces downhole. Additionally, environment factors such as vibrations may be controlled uphole but not controlled downhole. These give advantages for the information content of measurements to be discovered from the idler particle. The methods and systems described for moving downhole measurements uphole on corelated particles to those interacting with material downhole may comprise any of the various features of the compositions, methods, and system disclosed herein, including one or more of the following statements.

Statement 1: A system may comprise a quantum entangled photon source that entangles an idler particle and a probe particle, a transmitter disposed in a wellbore and connected to the quantum entangled photon source by a transmitter waveguide, and a receiver disposed in the wellbore. The system may further comprise a carrier laser connected to the receiver by a carrier waveguide, a detector connected to the carrier waveguide, and an information handling system in communication with the quantum entangled photon source, the carrier laser, and the detector.

Statement 2: The system of statement 1, further comprising an interface that connects the receiver to the carrier waveguide.

Statement 3: The system of statement 2, wherein the interface transfers a radio frequency of the probe particle to an optical medium on the carrier waveguide.

Statement 4: The system of statements 1 or 2, further comprising a splitter disposed on the transmitter waveguide between the quantum entangled photon source and the transmitter.

Statement 5: The system of statement 4, further comprising an idler waveguide that connects the splitter to the detector.

Statement 6: The system of statement 5, wherein the splitter separates the idler particle and the probe particle.

Statement 7: The system of any previous statements 1, 2, or 4, wherein the transmitter broadcasts the probe particle into a formation.

Statement 8: The system of any previous statements 1, 2, 4, or 7, wherein the receiver captures the probe particle from a formation.

Statement 9: The system of any previous statements 1, 2, 4, 7, or 8, wherein the detector measures the idler particle at surface.

Statement 10: The system of statement 9, wherein the idler particle is affected by the probe particle that the idler particle is entangled to.

Statement 11: A method may comprise broadcasting a probe particle from a transmitter into a formation, capturing the probe particle with at least one receiver after the probe particle has interacted with the formation, and measuring the probe particle during an interaction with the formation using an idler particle in a detector.

Statement 12: The method of statement 11, further comprising entangling the probe particle and the idler particle in a quantum entangled photon source.

Statement 13: The method of statement 12, further comprising splitting the probe particle and the idler particle at a splitter, wherein the splitter is connected to the quantum entangled photon source by a transmitter waveguide.

Statement 14: The method of statement 13, further comprising directing the idler particle through an idler waveguide and to the detector connected to the idler waveguide.

Statement 15: The method of statement 13, further comprising directing the probe particle through the transmitter waveguide to the transmitter.

Statement 16: The method of statement 13, further comprising changing a radio-frequency of the probe particle to an optical medium at an interface.

Statement 17: The method of statement 16, wherein the interface connects a carrier waveguide to the receiver.

Statement 18: The method of statement 17, further comprising transmitting a carrier light from a carrier laser through a carrier waveguide to the interface.

Statement 19: The method of statements 11 or 12, wherein the at least one receiver is connected to the detector by a carrier waveguide.

Statement 20: The method of statements 11, 12, or 19, further comprising recording measurements taken by the detector with an information handling system that is connected to the detector.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the element that it introduces.

All numerical values within the detailed description and the claims herein modified by "about" or "approximately" with respect the indicated value is intended to take into account experimental error and variations that would be expected by a person having ordinary skill in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system comprising:
a quantum entangled photon source that entangles an idler particle and a probe particle;
a transmitter disposed in a wellbore and connected to the quantum entangled photon source by a transmitter waveguide;
a receiver disposed in the wellbore;
a carrier laser connected to the receiver by a carrier waveguide;
a detector connected to the carrier waveguide; and
an information handling system in communication with the quantum entangled photon source, the carrier laser, and the detector.

2. The system of claim 1, further comprising an interface that connects the receiver to the carrier waveguide.

3. The system of claim 2, wherein the interface transfers a radio frequency of the probe particle to an optical medium on the carrier waveguide.

4. The system of claim 1, further comprising a splitter disposed on the transmitter waveguide between the quantum entangled photon source and the transmitter.

5. The system of claim 4, further comprising an idler waveguide that connects the splitter to the detector.

6. The system of claim 5, wherein the splitter separates the idler particle and the probe particle.

7. The system of claim 1, wherein the transmitter broadcasts the probe particle into a formation.

8. The system of claim 1, wherein the receiver captures the probe particle from a formation.

9. The system of claim 1, wherein the detector measures the idler particle at surface.

10. The system of claim 9, wherein the idler particle is affected by the probe particle that the idler particle is entangled to.

11. A method comprising:
entangling a probe particle and an idler particle in a quantum entangled photon source;
splitting the probe particle and the idler particle at a splitter, wherein the splitter is connected to the quantum entangled photon source by a transmitter waveguide
broadcasting the probe particle from the transmitter waveguide into a formation;
capturing the probe particle with at least one receiver after the probe particle has interacted with the formation;
changing a radio frequency of the probe particle to an optical medium at an interface; and
measuring the probe particle during an interaction with the formation using the idler particle in a detector.

12. The method of claim 11, further comprising directing the idler particle through an idler waveguide and to the detector connected to the idler waveguide.

13. The method of claim 11, further comprising directing the probe particle through the transmitter waveguide to the transmitter.

14. The method of claim 11, wherein the interface connects a carrier waveguide to the receiver.

15. The method of claim 14, further comprising transmitting a carrier light from a carrier laser through a carrier waveguide to the interface.

16. The method of claim 11, wherein the at least one receiver is connected to the detector by a carrier waveguide.

17. The method of claim 11, further comprising recording measurements taken by the detector with an information handling system that is connected to the detector.

* * * * *